Aug. 3, 1948.     H. J. LOVEGROVE     2,446,290
TELEMETERING
Filed Nov. 6, 1943                    2 Sheets-Sheet 1

INVENTOR.
Henry Joseph Lovegrove
BY
ATTY.

Aug. 3, 1948. H. J. LOVEGROVE 2,446,290
TELEMETERING
Filed Nov. 6, 1943 2 Sheets-Sheet 2
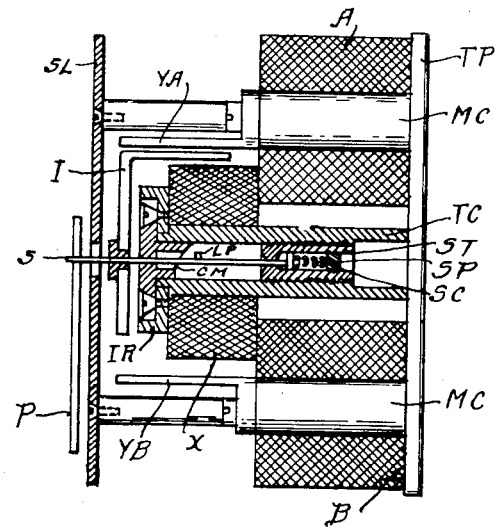
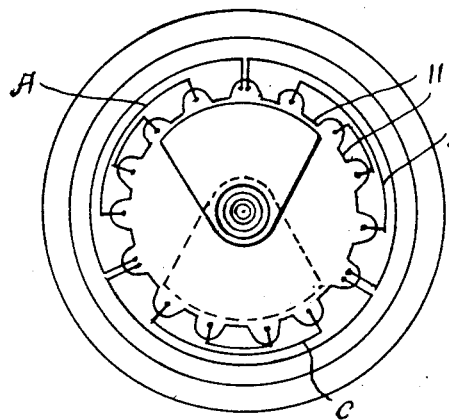
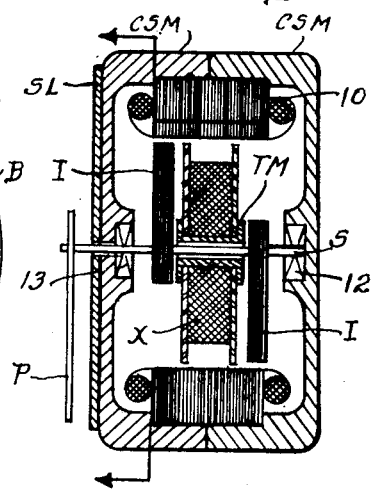
INVENTOR.
Henry Joseph Lovegrove
BY
ATTY.

Patented Aug. 3, 1948

2,446,290

UNITED STATES PATENT OFFICE 2,446,290

TELEMETERING

Henry Joseph Lovegrove, Enfield, England, assignor to Sangamo Electric Company, Springfield, Ill., a corporation of Illinois Application November 6, 1943, Serial No. 509,179
In Great Britain October 24, 1942

9 Claims. (Cl. 318—24)

1

The present invention concerns improvements in or relating to remote indication of measurements. In a known system of remote indication a transmitter comprising a three-phase two-pole stator and a single-phase two-pole rotor is employed, being connected over a plurality of leads with an indicator of similar construction, the single-phase two-pole rotors being supplied from a common source of alternating current, while the currents induced in the stator coils of the transmitter are fed to the corresponding coils of the indicator. The arrangement is such that if the rotor of the transmitter is set to the position corresponding to the measurements to be indicated then different currents will be induced in the respective coils of the stator dependent on the position of the rotor, and such currents flowing through the stator coils of the indicator interact with the field generated by the rotor to cause the rotor to take up a position corresponding to the position taken up by the rotor of the transmitter and therefore corresponding to the measurement to be indicated.

Such a construction involves a somewhat heavy moving system, the employment of substantial bearings to carry such a system, and the use of slip rings, and generally is not suitable for aircraft wherein heavy vibration is experienced. Certain attempts have been made to adapt the above known system for use in aircraft but the instruments evolved are heavy and not too robust.

This system of remote indication has however, several advantages, chief among which are that one basic panel instrument only is necessary for measuring different quantities such as; engine speed, engine temperature, air temperature, oil temperature, oil pressure, exhaust temperature, exhaust pressure, fuel level, and many others, all that is necessary is to have the scale plate calibrated in suitable units. Moreover, the instrument can be made with a scale angle of nearly 360° and the whole system is practically independent of temperature errors.

The object of the present invention is to provide a remote indicating system having the aforementioned advantages and at the same time having light moving parts and avoiding the use of slip rings.

According to the invention an arrangement is provided for transmitting instrument readings or like measurements to a distance, in which the armature is set to a position to link up to a variable extent, according to the reading to be transmitted, an exciting coil or coils with a plurality of other coils, all of which coils are fixed relatively

2 to each other, to cause currents to be generated in said other coils in proportionate values, which characterise the position. Each current so generated in each of said other coils is fed to a corresponding coil in a receiver whereby an armature thereat is caused to take up a position corresponding to the first-mentioned armature.

According to a further feature of the invention a transmitter comprises an exciting coil, a plurality of other coils fixed with relation to the exciting coil and arranged to be linked magnetically with said exciting coil to a variable extent by a rotatable armature, whereby if said exciting coil is fed with alternating current, current is induced into said other coils in proportions dependent upon the position of the armature.

According to a further feature of the invention a receiver is provided comprising an exciting coil, a plurality of other coils fixed with relation to the exciting coil, and a rotatable armature arranged to be set to different angular positions in accordance with the values of the currents flowing in said other coils. Preferably a transmitter and receiver are identical in construction except that in the case of a transmitter the armature is set in accordance with the readings of the transmitter while in the case of a receiver the armature takes up a position dependent upon the proportionate values of the currents received.

The invention will be better understood by referring to the accompanying drawings, in which Fig. 1 shows diagrammatically a fragmentary axial sectional view of one construction of instrument which may be either a transmitter or receiver.

Fig. 7 is an axial sectional view of a construction similar to that shown in Fig. 5, with a magnetic arrangement for ensuring that the pointer is off scale when no current is flowing.

Figs. 8 and 9 show a further alternative of robust construction.

Figure 1:
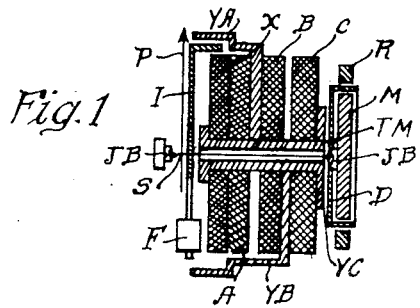

Referring to Fig. 1, X represents the operating coil which is excited from an alternating current supply irrespective of whether the device is functioning as a transmitter or receiver. A, B and C are coils mounted coaxially with coil X on a tubular magnetic member TM having its ends belled over and providing a path of small reluctance for the flux to the operating iron on armature I.

Figure 2:
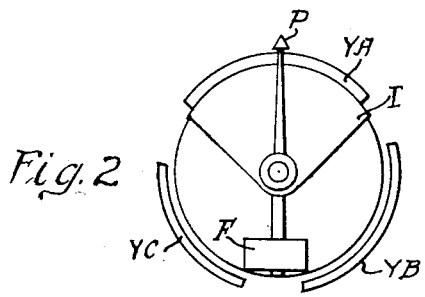
Fig. 2 shows an end view of Fig. 1, employing one shape of armature.
Figure 3:
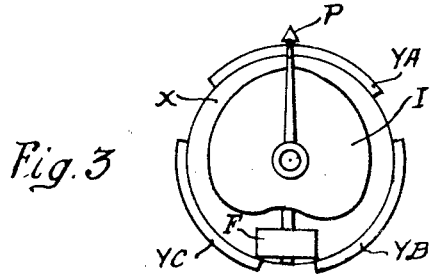
Fig. 3 shows an end view of Fig. 1, employing an alternative shape of armature.

YA, YB and YC are the yokes for the three coils, A, B and C respectively. Each yoke resembles in shape the sector of a cup and the yokes are angularly disposed with relation to each other as shown in Figs. 2 and 3, i. e. about 120° apart. The yoke YA is located with its base between coils A and B, the yoke YB between coils B and C, and the yoke YC just beyond C. The axial lengths or depths of the yokes are different so that they all terminate in substantially the same plane normal to the staff S, as shown at the left of Fig. 1. The radius of each yoke is enlarged so as to leave a gap between the outer periphery of coil X and each yoke so as to provide a path for the operating iron I. The staff S passes through the tube TM and is supported on jewelled or like bearings JB at each end. At one end the staff carries a pointer P and the operating iron I, while at the other end it carries a damping cup D.

The pointer P moves over a scale to indicate the position of the armature or inductor rotor I. This armature or inductor rotor may be either sector shaped with a curved rim extending into the circular space left between the operating coil X and the yoke extensions YA, YB, YC as shown in Fig. 2, or it may be heart shaped as shown in Fig. 3. In the latter case it is only necessary for the yoke extensions to extend slightly beyond the left hand side for operating coil X and there is no necessity of leaving a recess or gap between the yoke extensions and the coil X, as in Fig. 2.

The damping cup, which is preferably made of aluminium, is so arranged that its side extends into an air gap between a permanent magnet M and a magnetic ring R forming a return path for the damping flux. An adjustable counterbalance, diagrammatically indicated at F, counterbalances more or less of the off-center weight of the inductor rotor I.

Figure 4:
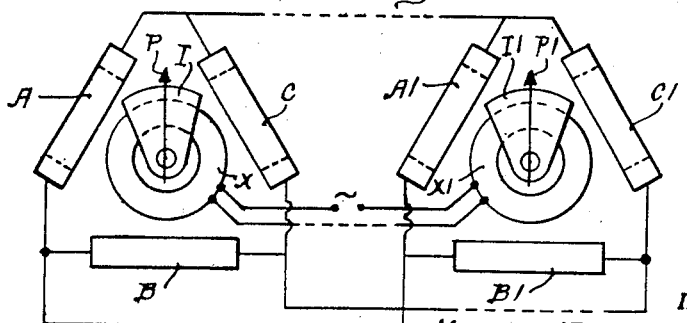
Fig. 4 shows the circuit connections between a transmitter and a receiver.

The circuit connections between the transmitter and receiver, which are identical in construction, may conveniently be as shown in Fig. 4. The reference letters X, A, B, C represent the coils for the transmitter as described with reference to Fig. 1, and the reference letters XI, AI, BI, CI represent like coils for the receiver. It will be noted that a source of A. C. supply is fed to the coils X and XI in parallel or in series. With this arrangement only three synchronizing conductors extend between transmitter and receiver, other than the exciting current supply connections leading to the exciting coils X and XI. The three synchronizing conductors extend between corresponding junction points in the closed series circuits connecting synchronizing coils A, B and C with the other synchronizing coils AI, BI and CI.

This simplifies the cabling and interconnecting plugs and jacks which may be used, although it will be understood that if desired separate leads may be provided for some or all of the coils, in which case the number of interconnecting leads would be increased.

The operation is as follows:

At the transmitting end the pointer P is set to a position on the scale corresponding to the reading to be transmitted. The operating iron therefore takes up a position which is differently disposed as regards its angular relationship with respect to the three yokes YA, YB, YC. Hence the coil X will be linked with the coils A, B and C through paths the reluctance of which depends upon said angular relationship for each coil. In the position shown the coil A will be very tightly linked while the coils B and C will be very loosely linked so that there is a larger current induced in A and very little in B and C. These currents travel over the connecting leads to coils AI, BI and CI respectively and consequently the operating iron of the receiver moves to a position where the strongest field is created and this corresponds exactly to the position of the pointer P at the transmitter so that the pointer at the receiver reads the same.

If for instance the pointer P at the transmitter was set to a position at 90° in a clockwise direction (as viewed in Fig. 2) to that first considered, in addition to there being a linking between coils X and A there will also be a tighter linking between coils X and B. Hence currents will be induced in coils A and B proportional to the relative field strengths. These currents in the same proportions excite coils AI and BI at the receiver and the operating iron of the receiver moves to a position where the strongest field is created which will be when the combined effect of coils AI and BI is such that the operating iron is influenced by the magnetic fields created thereby in the same proportions as the exciting currents. Therefore the operating iron and the pointer will take up exactly the same position at the receiver as represented by the pointer P at the transmitter.

Figure 5:
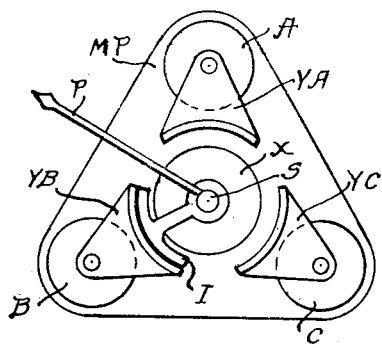
Fig. 5 shows in end elevation an alternative construction to that illustrated in Fig. 1.

Fig. 5 shows an alternative construction in which the coil X is mounted on a triangular magnetic plate MP and is surrounded by the three coils A, B and C, which are also mounted at the three corners of the triangular plate so as to be angularly separated with respect to the axis of the coil X at angles of 120°. The coil X has a magnetic tubular core which is connected to the magnetic plate MP and through which a staff S passes carrying a pointer P and an operating iron I. On each core of the coils A, B and C are mounted yoke members YA, YB, YC respectively shaped as shown, that is to say, with a sector portion connected to the core and an upturned portion having its edge curved so as to be coaxial with the staff S. The operating iron I is shaped with a boss on the staff S and an arm carrying at its end a plate curved with its centre on the axis of the staff, this curved plate being adapted to travel between the coil X and the yokes YA, YB and YC. It will thus be clear that according to the position of the pointer P and the operating iron I, currents will be induced in the coils A, B and C in proportion to the extent that the operating iron enters the respective fields. The circuit connections and operation are substantially as previously described.

Figure 6:
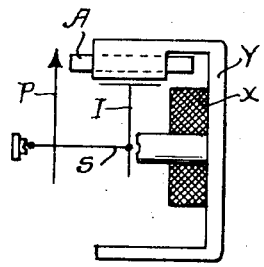
Fig. 6 is a diagrammatic side or axial view showing a further alternative construction.

Fig. 6 shows a further alternative in which a cup shaped yoke member Y is provided of magnetic material having a central core for the operating coil X and radial cores disposed at 120° to each other and projecting radially inwardly from the inner side of the cup, these three cores being for the coils A, B and C respectively. The operating iron I is supported on a staff S near the vicinity of the core for the coil X and having an arcuate portion adapted to travel in a circular path just clear of the inner ends of the cores of coils A, B and C. The iron I has an arcuate length or span of approximately 90° as in Fig. 2, and here again it is not felt that any further description is necessary.

Fig. 7 shows an arrangement corresponding to that shown in Fig. 5 but in which the bearing arrangement is illustrated in greater detail and in which the coil X is not mounted directly against a supporting plate. In this figure it will be noted that the coils A, B and C, of which only A and B are shown, are arranged at three corners of a magnetic plate TP conveniently of the shape of an equilateral triangle and having a central hole. Magnetic cores MC extend from this plate at right angles thereto for each of the coils A, B and C while a tubular magnetic core TC extends from the central hole for the coil X. This tubular member is threaded to enable the staff S to be supported in two bearings. One bearing consists of a screw tube ST which is threaded into the tubular magnetic core TC and provides a bearing for the staff at one end, while inside there is a space in which a spring SP is compressed against a plate which acts against an end of the staff, the strength of which spring can be adjusted by means of a screw SC.

An iron ring IR is screwed on to the end of the magnetic tubular member farthest from the triangular plate TP, and a bearing is secured by screws to this iron ring, which bearing is in the form of a bushing and extends into the magnetic tube TC. The end of this extension is given a camlike shape CM for a purpose to be described later. The staff S carries an operating iron I which is conveniently sector shaped with an upturned rim curved so as to travel round the outside of the coil X. The staff also carries a pointer P which rotates in front of a scale SL secured by pillars to the cores MC. Each core is provided with a yoke member such as YA, YB which are secured to the end of the cores MC and serve to act as pole pieces for the coils A, B and C similar to those previously described. It will be noted that the staff is adapted to move in this bearing in a longitudinal direction.

As illustrated it is assumed that operating current is flowing through the coil X, consequently the operating iron is attracted to the position shown where the staff S compresses the spring SP and the location pin LP is held away from the cam CM. On the removal of operating current, the spring SP becomes effective to move the staff to the left, consequently the location pin LP engages the cam surface CM and the staff is caused to rotate to bring the pointer to an off-scale position. The advantage of this method of bearing construction is that no undesirable control force is placed on the pointer under operating conditions.

In the arrangement illustrated in Figs. 8 and 9 the stator is formed of laminations 10 of ring shape with inwardly facing teeth 11 forming slots in which the stator coil may be wound as in the well known construction of three-phase machines illustrated diagrammatically in Fig. 8, while the rotor consists of two sectionally shaped irons I extending in diametrically opposite directions and mounted on opposite ends of the staff S. In the space between the irons the stationary exciting coil X is mounted. The exciting coil is wound on a tubular member TM of magnetic material through which the staff carrying the irons passes. Two cup shaped members CSM form a casing which are secured together by bolts or the like (not shown) and serve to secure the laminations 10 in position. These cup shaped members which are formed of non-magnetic material are provided one with an end bearing 12 and the other with a bearing 13 through which the staff passes. The staff carries the pointer P in front of the scale SW secured to the latter cup-shaped member. The coil X is secured in position with respect to the laminations 10 and the staff and irons are subsequently placed in position.

I claim:

1. In telemetering apparatus, the combination of two units adapted to operate as a transmitter and a receiver in a telemetering system, each of said units comprising a fixed exciting coil and a plurality of fixed synchronizing coils arranged in cooperative relation, said plurality of fixed synchronizing coils being all wound concentrically about a common axis, means for energizing the exciting coil of each unit with a periodically varying current, an inductor armature of magnetic material at each unit for establishing variable magnetic paths between the exciting coil and the synchronizing coils of its respective unit, and circuit connections between the synchronizing coils of one unit and the synchronizing coils of the other unit.

2. In telemetering apparatus, the combination of a plurality of units adapted to operate as a transmitter and a receiver in a telemetering system, each of said units comprising an exciting coil and a plurality of synchronizing coils all wound concentrically about a common axis and held against movement relatively to each other, means for energizing the exciting coil of each unit with an alternating current, an inductor armature at each unit operative by rotation to establish variable magnetic paths between the exciting coil and the synchronizing coils of its respective unit, and circuit connections between the synchronizing coils of the respective units.

3. In telemetering apparatus, the combination of two units adapted to operate as a transmitter and a receiver in a telemetering system, each of said units comprising a stationary exciting coil, means for energizing the exciting coil of each unit with an alternating current, an inductor armature of magnetic material rotative coaxially of said exciting coil at each unit, a plurality of stationary synchronizing coils all wound concentrically about the common axis of said exciting coil and said inductor armature whereby rotation of said armature is operative to establish variable magnetic paths between the exciting coil and the synchronizing coils, and circuits connecting the synchronizing coils of one unit with the synchronizing coils of the other unit.

4. In telemetering apparatus, the combination of two units adapted to operate as a transmitter and as a receiver in a telemetering system, each of said units comprising a stationary exciting coil and a plurality of stationary synchronizing coils having their magnetic axes concentric to the magnetic axis of said exciting coil, means for energizing the exciting coil of each unit with an alternating current, magnetic pole members extending from each of said synchronizing coils and grouped in circular relation to said exciting coil, an inductor armature of magnetic material at each unit for establishing variable magnetic paths between the exciting coil and the magnetic pole members of said synchronizing coils, and circuits connecting the synchronizing coils of one unit with the synchronizing coils of the other unit.

5. In telemetering apparatus, the combination of two units adapted to operate as a transmitter and as a receiver in a telemetering system, each of said units comprising an exciting coil and a plurality of synchronizing coils stationarily mounted in coaxial relation, means for energizing the exciting coil of each unit with a periodically varying current, an inductor armature of magnetic material at each unit for establishing variable magnetic paths between the exciting coil and the synchronizing coils of its respective unit, and circuit connections between the synchronizing coils of one unit and the synchronizing coils of the other unit.

6. In telemetering apparatus, the combination of a fixed exciting coil, a plurality of fixed synchronizing coils disposed coaxially of said exciting coil, means for energizing the exciting coil with a periodically varying current, and a rotary inductor armature of magnetic material for establishing variable magnetic paths between the exciting coil and the synchronizing coils.

7. In telemetering apparatus, the combination of a stationary exciting coil and a plurality of stationary synchronizing coils arranged in coaxial relation, means for energizing said exciting coil with an alternating current, and an inductor armature of magnetic material for establishing variable magnetic paths between the exciting coil and said synchronizing coils.

8. In a telemetering system the combination of a transmitter and a receiver each having a stationary exciting coil and a plurality of telemetering coils disposed coaxially of said exciting coil, means for energizing said exciting coils with alternating current, a transmitter inductor rotor at said transmitter rotatable to different positions in response to an actuating force and operative in such rotation to vary the alternating current flux density passing between the exciting coil and the telemetering coils of said transmitter, circuit connections extending between the telemetering coils of the transmitter and the telemetering coils of the receiver whereby variations in the flux density threading the transmitter telemetering coils causes substantially proportionate variations in the energization of the receiver telemetering coils, and a receiver inductor rotor at said receiver rotatable to different positions in response to such variations in the energization of the receiver telemetering coils.

9. In a telemetering system, the combination of a transmitting unit and a receiving unit, each of said units comprising a stationary exciting coil and at least three stationary synchronizing coils all arranged in axial alignment, a spindle extending axially through said coils, a rotary damping system connected to one end of said spindle, a segment shaped inductor rotor connected to the other end of said spindle, segment shaped stator members extending from each of said synchronizing coils for coacting with said inductor rotor, means for supplying alternating current to the exciting coils of both units, and parallel circuits connecting the synchronizing coils of both units.

HENRY JOSEPH LOVEGROVE.

REFERENCES CITED

The following references are of record in the file of this patent:

UNITED STATES PATENTS

| Number | Name | Date |
| --- | --- | --- |
| 705,482 | Thiermann | July 22, 1902 |
| 1,431,627 | Bristol et al. | Oct. 10, 1922 |
| 1,653,947 | Decker | Dec. 27, 1927 |
| 1,706,149 | Ellis | Mar. 19, 1929 |

FOREIGN PATENTS

| Number | Country | Date |
| --- | --- | --- |
| 155,648 | Great Britain | Dec. 23, 1920 |